June 16, 1959  R. W. LOEFFLER  2,890,595
BOAT STEERING MECHANISMS
Filed March 11, 1957  2 Sheets-Sheet 1
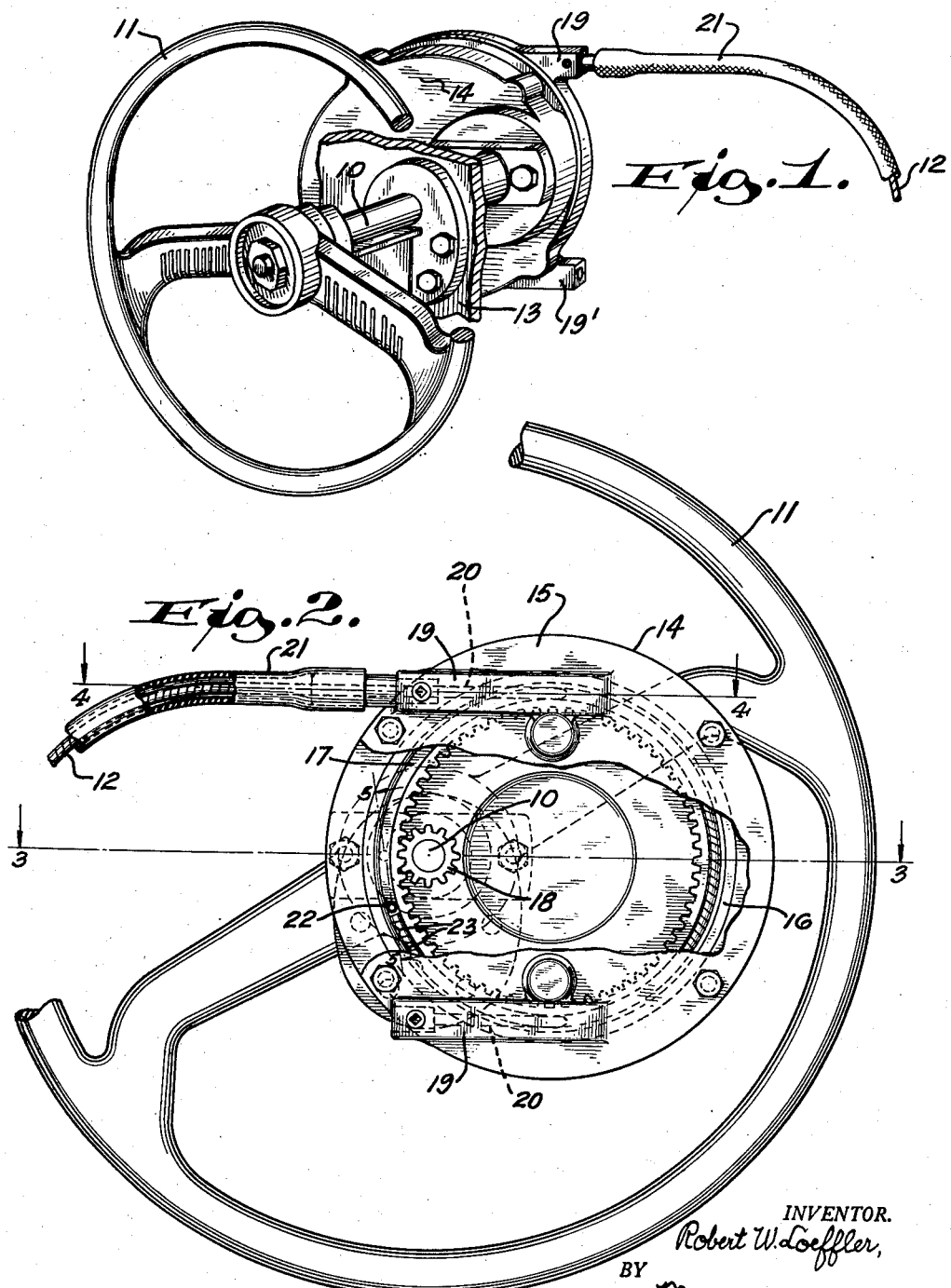
INVENTOR.
Robert W. Loeffler,
BY Morsell & Morsell
ATTORNEYS.

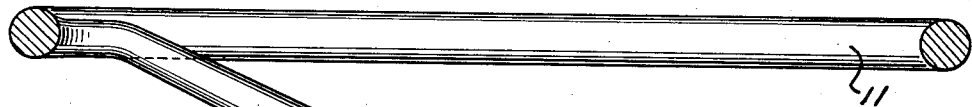
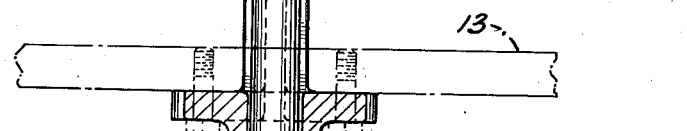
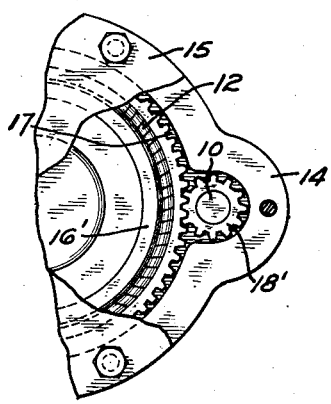
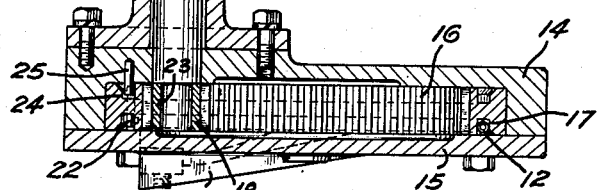
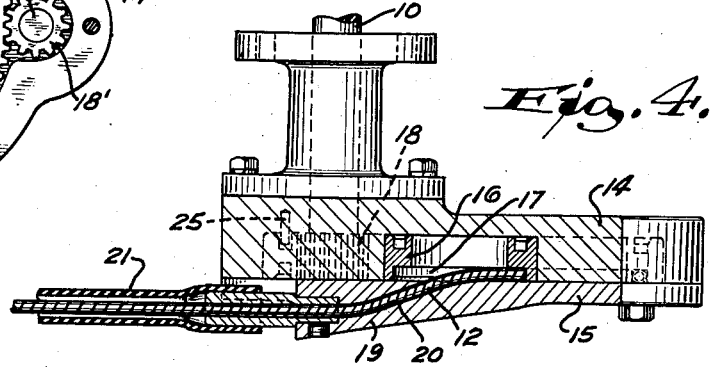

United States Patent Office 2,890,595
Patented June 16, 1959

2,890,595
BOAT STEERING MECHANISMS

Robert W. Loeffler, Sheboygan, Wis., assignor to The Vollrath Co., Sheboygan, Wis., a corporation of Wisconsin Application March 11, 1957, Serial No. 645,151

3 Claims. (Cl. 74—498)

This invention relates to improvements in boat steering mechanisms, and more particularly to a boat steering mechanism which will permit efficient and positive rudder control by a remotely mounted steering wheel.

A general object of the invention is to provide, for boats equipped with outboard motors and the like, a steering wheel actuated mechanical steering mechanism which will control the boat or motor rudder and which may be mounted in any convenient portion of the boat remote from the motor and rudder.

A more specific object of the invention is to provide a rotary steering mechanism for boats having a housing which encloses meshing gears which are caused to rotate within the housing by a wheel operated steering shaft to reciprocate an attached flexible shaft which extends to the boat rudder for steering purposes.

A further specific object of the invention is to provide, in a mechanical rotary steering mechanism, a large circular gear having a concentric groove in the face thereof within which a portion of a flexible steering cable is housed in a manner to movably extend through the gear case cover at a tangent to the cable receiving groove in the gear.

There is on the market a type of mechanical rotary steering mechanism for boats wherein a portion of the flexible steering cable lodges within a peripheral groove in a rotatable gear. In this type of construction the gear and flexible cable rotate together within a circular housing when the connected steering wheel is turned. Because of the fact that the housing is stationary and the cable moves the latter generates friction against the adjacent internal side wall of the enclosing housing. When the ring gear is turned in a direction to project the cable outwardly of the housing the uncoiling effect on the housed portion of the cable increases its diameter and produces a braking effect against the inner side wall of the housing which becomes progressively greater in proportion to the load applied by the steering wheel as resistance offered to the steering operation by the boat and motor increases. In the type of construction mentioned, under extreme conditions the mechanism can become inoperative because of the friction and braking effect thus generated.

With the foregoing in mind it is a specific object of the present invention to provide a mechanical rotary steering mechanism which eliminates the objection as to progressively increased friction on the steering cable, through the provision of a beveled concentric groove within a face portion of the turnable gear, which groove houses considerably more than 180° of the confined portion of the steering cable and eliminates any possibility of peripheral friction and braking effect on the cable since the cable is coiled and uncoiled entirely within the concentric groove of the moving gear.

A further more specific object of the invention is to provide, in a mechanical rotary steering mechanism, simple means for removably anchoring the inner end of the cable within the gear groove to insure proper positioning of the cable within the groove, together with a bored boss on the housing cover which is slightly inclined so as to direct the cable into and out of the gear groove in a natural, friction-free manner and direction.

A further specific object of the invention is to provide, in a mechanical rotary steering mechanism, co-operating stop means on the cable coiling gear and housing to limit turning movements of the gear in both directions.

A further object of the invention is to provide a mechanical rotary steering mechanism for boats which may be easily applied to a desired portion of a boat, which permits easy control of the boat rudder from a remote point, which is compact, unitary and attractive in appearance, which is positive and efficient in operation, and which is well adapted for the purposes described.

With the above and other objects in view, the invention consists of the improved boat steering mechanism, and its parts and combinations as set forth in the claims, and all equivalents thereof.

In the accompanying drawings, in which the same reference characters indicate the same parts in all the views:

Fig. 1 is a perspective view of a boat steering wheel and associated mechanical steering mechanism mounted on a frame portion of a boat, the steering mechanism embodying the improvements of the present invention;

Fig. 2 is an enlarged inverted fragmentary plan view of the steering wheel and associated mechanism with a portion of the steering mechanism housing cover being broken away to show features of construction, a portion of the steering cable sheath being broken away and in section;

Fig. 3 is a sectional view taken along the line 3—3 of Fig. 2;

Fig. 4 is a detailed sectional view taken along the line 4—4 of Fig. 4;

Fig. 5 is an enlarged fragmentary detailed sectional view taken on line 5—5 of Fig. 2; and Fig. 6 is a fragmentary view of the cover plate side of the steering mechanism housing with the cover plate broken away to show a modified form of the invention which includes a spur gear and a meshing steering shaft operated pinion gear.

Referring now more particularly to the drawings it will appear that the improved mechanical rotary steering mechanism is adapted to transform rotary movement applied to a steering shaft 10 through a manually operated steering wheel 11, fast on the shaft 10, to reciprocatory movement of a flexible shaft 12 which extends to a boat rudder (not shown) which may be at a point in the boat remote from where the steering mechanism is mounted.

From Fig. 1 it will be observed that the steering shaft 10 can be mounted through an instrument panel or dashboard 13 on a desired portion of the boat remote from the rudder and the shaft 10 extends operatably into a housing 14 whose inner open face is normally closed by a housing cover 15 bolted thereto. The housing 14 is provided with a circular cavity to oscillatably receive therein a large ring gear 16 formed adjacent its periphery with a circular beveled groove 17. The inner end of the steering shaft 10 extends into the housing 14 and has fast thereon a pinion 18 whose teeth mesh with the internal teeth of the ring gear 16. Obviously when the steering wheel 11 is turned in either direction the steering shaft 10 will be turned thereby to positively turn the pinion which, by meshing with the ring gear, turns the ring gear in a desired direction to wind or unwind the portion of the flexible shaft 12 which is lodged in the ring gear groove 17 in the form of a partial circle.

The housing cover 15 which closes the open side of the housing 14 and the gears therewithin is formed on its outer surface with a pair of bosses 19 and 19'. Two bosses are provided and either one is selectively used for the flexible cable 12, depending upon whether the steering mechanism is to be mounted on the starboard or port side of the boat. Both bosses are provided with longitudinally extending slightly inwardly inclined portions 20 whose outer ends open outwardly of the bosses, and whose inner ends register tangentially with portions of the circular ring gear groove 17. As will be seen from Fig. 2, in practice only one of the bosses is used, and as illustrated the outer end of the boss 19 has attached thereto a portion of a sheath or housing 21 for the flexible shaft 12 and the inner portion of the flexible shaft 12 extends movably through the bore 20 of the boss 19 and into and around the major portion of the circular ring gear groove 17. The inner end portion of the partially wound and confined flexible shaft 12 abuts a transverse stop post 22 mounted in the ring gear 16 and projecting into the groove 17. Bolts or pins 23 threaded into the side of the ring gear may be brought into clamping engagement with the inner extremity of the flexible shaft so as to anchor it within the groove 17. It will thus be seen that the flexible shaft 12 enters the ring gear groove 17 from the bore of the boss 19 at a slight inclination and tangentially to the groove 17.

The inner face of the ring gear is also formed with a circular groove 24 parallel to the shaft-receiving groove 17 and said groove 24 is entered by the end portion of a pin 25 secured to a body portion of the housing 14. Turning movement of the ring gear 16 in either direction is limited by engagement of an inner portion of the pin 22 which also projects into the groove 24 with the projecting portion of the pin 25, and this limits the manual movement of the steering wheel 11 in either direction.

Depending upon the direction in which the steering wheel 11 is manually turned the ring gear 16 will be turned in a direction to either wind or unwind that portion of the flexible shaft 12 which is lodged within the ring gear circular groove 17. As the ring gear groove is concentric to the periphery of the ring gear and meets the bore of the boss 19 tangentially with the boss bore 20 being slightly inclined, there is a minimum of friction imposed on the flexible shaft as it is wound in or played out to impart movement in either direction to the associated rudder. The wound portion of the flexible shaft is completely housed within the ring gear groove and as the ring gear is moved to play out or wind in the flexible shaft there is a complete freedom of any rubbing against or friction on the flexible shaft such as would cause a braking effect and resist free movement of the flexible shaft.

In Fig. 6 of the drawings a slight modification in the gear arrangement contained within the steering mechanism housing 14 is illustrated. There the large gear 16' is a spur gear whose outer or peripheral teeth are in mesh with a pinion 18' mounted fast on an inner end portion of the steering shaft 10 which extends into an offset portion 14' of the housing 14. The beveled concentric circular groove in the face of the spur gear 16' is just inwardly of the spur gear teeth and houses the wound portion of the flexible shaft 12. The spur gear 16 is, of course, rotatably mounted within the housing 14.

From the foregoing description it will be seen that the improved rotary mechanical steering mechanism for boats provides for positive and efficient rudder control and movement by a steering wheel, eliminates friction on the flexible shaft which extends from the steering mechanism to the boat rudder, is compact, and is well adapted for the purposes described.

What is claimed as the invention is:

1. A boat steering mechanism, comprising a housing, a steering shaft extending revolubly into said housing, a steering wheel on the outer end of said steering shaft, a pinion fast on the inner end of the steering shaft, a gear rotatably mounted in said housing and in mesh with said pinion, one face of said gear being formed adjacent its periphery with a circular groove and the opposite face of said gear being formed with a parallel circular groove, an elongated flexible rudder control shaft connectable at its outer end to a remote boat rudder, the inner end of said shaft lodging in one of said parallel grooves, a pin mounted in the gear and projecting into both of said parallel gear grooves, and a second pin mounted in the housing and projecting into one of said gear grooves, the turning movement of the gear in either direction being limited by the engagement of the projecting portions of both of said pins.

2. A boat steering mechanism, comprising a housing, a steering shaft extending revolubly into said housing, a steering wheel on the outer end of said steering shaft, a pinion fast on the inner end of the steering shaft, a pair of separated, wedge-shaped rudder control shaft guide bosses formed on said housing, each of said guide bosses having an inwardly inclined opening therethrough, a gear rotatably mounted in said housing and in mesh with said pinion, one face of said gear being formed adjacent its periphery with a circular groove and the opposite face of said gear being formed with a parallel circular groove, an elongated flexible rudder control shaft connectable at its outer end to a remote boat rudder, the inner end portion of said shaft extending movably through one of said guide boss openings and lodging in one of said parallel gear grooves, a pin mounted in the gear and projecting into both of said gear grooves, and a second pin mounted in the housing and projecting into one of said gear grooves, the turning movement of the gear in either direction being limited by the engagement of the projecting portions of said pins.

3. A boat steering mechanism, comprising a housing, a steering shaft extending revolubly into said housing, a steering wheel on the outer end of said steering shaft, a first gear fast on the inner end portion of the steering shaft, a second gear rotatably mounted in said housing and in mesh with said first gear, one face of said second gear being formed adjacent its periphery with a circular groove and the opposite face of said gear being formed with a parallel circular groove, an elongated flexible rudder control shaft connectable at its outer end to a remote boat rudder, the inner end of said shaft lodging in one of said parallel grooves, a protuberance carried by the second gear and projecting into both of said parallel gear grooves, and a second protuberance carried by the housing and projecting into one of said gear grooves, the turning movement of the second gear in either direction being limited by the engagement of the projecting portions of both of said protuberances.

References Cited in the file of this patent

UNITED STATES PATENTS

| 916,893 | Seely | Mar. 30, 1909 |
| 1,627,697 | Fredericks | May 10, 1927 |
| 2,321,780 | Tondeur | June 15, 1943 |
| 2,448,696 | Arens | Sept. 7, 1948 |
| 2,767,596 | Simon et al. | Oct. 23, 1956 |

FOREIGN PATENTS

| 39,203 | France | July 28, 1931 |
| 810,776 | France | Jan. 6, 1935 |
| 1,031,219 | France | June 22, 1953 |
| 485,925 | Germany | Nov. 6, 1929 |